US008847963B1

(12) United States Patent
Comet et al.

(10) Patent No.: US 8,847,963 B1
(45) Date of Patent: Sep. 30, 2014

(54) SYSTEMS AND METHODS FOR GENERATING SKIN AND VOLUME DETAILS FOR ANIMATED CHARACTERS

(75) Inventors: Michael Comet, Concord, CA (US); William F. Sheffler, Hercules, CA (US); Ryan Kautzman, San Francisco, CA (US); Jiayi Chong, San Bruno, CA (US); Jonathan Page, Lafayette, CA (US)

(73) Assignee: Pixar, Emeryville, CA (US)

( * ) Notice: Subject to any disclaimer, the term of this patent is extended or adjusted under 35 U.S.C. 154(b) by 376 days.

(21) Appl. No.: 13/017,533

(22) Filed: Jan. 31, 2011

(51) Int. Cl.
*G06T 19/00* (2011.01)
*G06T 17/20* (2006.01)
*G06T 13/40* (2011.01)

(52) U.S. Cl.
USPC .................. 345/473; 345/419; 345/630

(58) Field of Classification Search
USPC .................................................. 345/423
See application file for complete search history.

(56) References Cited

U.S. PATENT DOCUMENTS

| | | | | |
|---|---|---|---|---|
| 6,476,804 B1 * | 11/2002 | Costabel | .................. | 345/419 |
| 6,483,506 B1 * | 11/2002 | Costabel | .................. | 345/419 |
| 6,657,629 B2 * | 12/2003 | Baraff et al. | .................. | 345/474 |
| 6,909,431 B1 * | 6/2005 | Anderson et al. | .................. | 345/473 |
| 7,236,170 B2 * | 6/2007 | Sepulveda | .................. | 345/423 |
| 8,044,962 B1 * | 10/2011 | Pighin et al. | .................. | 345/473 |
| 2004/0227761 A1 * | 11/2004 | Anderson et al. | .................. | 345/473 |
| 2006/0022991 A1 * | 2/2006 | Scheepers et al. | .................. | 345/582 |
| 2007/0030266 A1 * | 2/2007 | Styles | .................. | 345/420 |
| 2009/0135189 A1 * | 5/2009 | Kim et al. | .................. | 345/473 |
| 2009/0213138 A1 * | 8/2009 | DeRose et al. | .................. | 345/619 |
| 2009/0306948 A1 * | 12/2009 | Irving et al. | .................. | 703/6 |
| 2010/0033488 A1 * | 2/2010 | Zhou et al. | .................. | 345/473 |
| 2010/0134490 A1 * | 6/2010 | Corazza et al. | .................. | 345/420 |

FOREIGN PATENT DOCUMENTS

WO   WO 9906962 A1 *   2/1999   .............. G06T 15/70

OTHER PUBLICATIONS

Real Time Animated Grass, Brook Bakay 2002 http://www.cs.ubc.ca/labs/imager/tr/2002/bakay2002a/bakay.2002a.pdf.*
Modeling, animating, and rendering complex scenes using volumetric textures, Neyret, 1998 http://ieeexplore.ieee.org/xpls/abs_all.jsp?arnumber=675652&tag=1.*
Real-time fur over arbitrary surfaces, Jerome Lengyel et al, 2001, http://dl.acm.org/citation.cfm?id=364407.*
Interactive Volumetric Textures, Meyer, 1998 http://link.springer.com/chapter/10.1007/978-3-7091-6453-2_15*

* cited by examiner

*Primary Examiner* — David Zarka
*Assistant Examiner* — Jason Pringle-Parker
(74) *Attorney, Agent, or Firm* — Kilpatrick Townsend & Stockton LLP (57) ABSTRACT

This disclosure relates to computer-generated imagery (CGI) and computer-aided animation. More specifically, this disclosure relates to techniques for skin and volume simulation for use in CGI and computer-aided animation.

20 Claims, 7 Drawing Sheets

SYSTEMS AND METHODS FOR GENERATING SKIN AND VOLUME DETAILS FOR ANIMATED CHARACTERS

BACKGROUND

This disclosure relates to computer-generated imagery (CGI) and computer-aided animation. More specifically, this disclosure relates to techniques for adding dynamically generated details to animated objects for use in CGI and computer-aided animation.

With the wide-spread availability of computers, computer graphics artists and animators can rely upon computers to assist in production process for creating animations and computer-generated imagery (CGI). This may include using computers to have physical models be represented by virtual models in computer memory. Typically, two-dimensional (2D) or three-dimensional (3D) computer-aided animation combines 2D/3D models of objects and programmed movement of one or more of the models. In 3D computer animation, the first step is typically the object modeling process. Objects can be sculpted much like real clay or plaster, working from general forms to specific details, for example, with various sculpting tools. Models may then be constructed, for example, out of geometrical vertices, faces, and edges in a 3D coordinate system to represent the objects. These virtual models can then be manipulated using computers to, for example, simulate physics, design aesthetic actions such as poses or other deformations, crate lighting, coloring and paint, or the like, of characters or other elements of a computer animation display.

Pixar is one of the pioneering companies in the computer-generated imagery (CGI) and computer-aided animation industry. Pixar is more widely known as Pixar Animation Studios, the creators of animated features such as "Toy Story" (1995) and "Toy Story 2" (1999), "A Bugs Life" (1998), "Monsters, Inc." (2001), "Finding Nemo" (2003), "The Incredibles" (2004), "Cars" (2006), "Ratatouille" (2007), and others. In addition to creating animated features, Pixar develops computing platforms and tools specially designed for computer-aided animation and CGI. One such example is now known as PhotoRealistic RenderMan, or PRMan for short. PRMan is a photorealistic RenderMan-compliant rendering software system based on the RenderMan Interface Specification (RISpec) which is Pixar's technical specification for a standard communications protocol (or interface) between 3D computer graphics programs and rendering programs. PRMan is produced by Pixar and used to render their in-house 3D animated movie productions. It is also available as a commercial product licensed to third parties, sold as part of a bundle called RenderMan Pro Server, a RenderMan-compliant rendering software system developed by Pixar based on their own interface specification. Other examples include tools and plug-ins for programs such as the AUTODESK MAYA high-end 3D computer graphics software package from AutoDesk, Inc. of San Rafael, Calif.

One core functional aspect of PRMan can include the use of a "rendering engine" to convert geometric and/or mathematical descriptions of objects into images. This process is known in the industry as "rendering." For movies, other animated features, shorts, and special effects, a user (e.g., a skilled computer graphics artist) typically creates the geometric or mathematical description of objects, such as characters, props, background, or the like, that will used in the rendered image or animation sequence. In some instances, another user (e.g., a skilled articulator or rigger) typically creates a number of animation control variables (avars) for manipulating the objects. In further instances, yet another user (e.g., a skilled animator) typically uses the avars to pose the objects within the image or sequence and specify motions and positions of the objects over time to create an animation.

In other instances, objects may be too complex or the number of objects may be too large for a user to manipulate individual. As such, the production of CGI and computer-aided animation may involve the use of simulations and other dynamic techniques to specify motions and positions of the objects over time to create an animation. One of the challenges in creating visually appealing images of objects whose motions and positions are determined by simulations can be the balancing of a desire for a highly-detailed image of an object with the practical issues involved in allocating the resources (both human and computational) required to produce the highly-detailed image.

Accordingly, what is desired is to solve one or more of the problems relating to adding dynamically generated details to animated objects for use in CGI and computer-aided animation, some of which may be discussed herein. Additionally, what is desired is to reduce some of the drawbacks relating to adding dynamically generated details to animated objects for use in CGI and computer-aided animation, some of which may be discussed herein.

BRIEF SUMMARY

The following portion of this disclosure presents a simplified summary of one or more innovations, embodiments, and/or examples found within this disclosure for at least the purpose of providing a basic understanding of the subject matter. This summary does not attempt to provide an extensive overview of any particular embodiment or example. Additionally, this summary is not intended to identify key/critical elements of an embodiment or example or to delineate the scope of the subject matter of this disclosure. Accordingly, one purpose of this summary may be to present some innovations, embodiments, and/or examples found within this disclosure in a simplified form as a prelude to a more detailed description presented later.

This disclosure relates to computer-generated imagery (CGI) and computer-aided animation. More specifically, this disclosure relates to techniques for skin and volume simulation for use in CGI and computer-aided animation.

In one embodiment, a method for facilitating computer-generated animation includes the step of receiving information identifying an animated surface. Animation data associated with the animated surface is further received at each time step of an animation sequence. Information identifying a simulated surface is received. Simulation properties associated with the simulated surface are further received. In one aspect, a rest state of the simulation surface at a given time step of an animation sequence is modified or retargeted based on the animation data associated with the animated surface and a correspondence between the animated surface and the simulated surface. Simulation data is received in response to a simulation of the simulated surface using a finite element method based on the modified rest state of the simulated surface, a set of finite elements associated with the simulated surface, and the simulation properties. Details of the simulation can be incorporated onto the animated surface based on the animation data and the simulation data. In one aspect, another surface may be generated.

In some embodiments, generating another surface based on the animated surface, the animation data associated with the animated surface, the simulated surface, and the simulation data associated with the simulated surface may include generating a third surface with surface details provided by the animation data and surface details provided by the simulation data. In another aspect, a third surface may be generated in response to blending between a predetermined amount of surface details provided by the animation data and a predetermined amount of surface details provided by the simulation data. In a still further aspect, generating a third surface preserves the silhouette of the animated surface.

In various embodiments, simulation data may be generated in response to a spring model that constrains motion of the simulated surface relative to a predetermined shape of the animated surface. In another embodiment, simulation data may be generated in response to a spring model that influences how a location associated with the simulated surface seeks to return toward a location associated with the animated surface. A correspondence between the animated surface and the simulated surface may defined an association between the locations.

In yet another embodiment, a non-transitory computer-readable medium stores computer-executable code for facilitating computer-generated animation. The computer-readable medium may include code for receiving animation data associated with a first surface, code for modifying a rest state of a second surface at a given time step of an animation sequence based on the animation data associated with the first surface and a correspondence between the first surface and the second surface, code for receiving simulation data in response to a simulation of the second surface using a finite element method based on the modified rest state of the second surface, a set of finite elements associated with the second surface, and simulation properties associated with the second surface, and code for generating a third surface based on the first surface, the animation data associated with the first surface, the second surface, and the simulation data associated with the second surface.

In further embodiments, animation data may be provided for an object defining position of selected triangles of a first polygonal mesh representing the object at selected frames of an animation sequence of the object. For each frame of the animation sequence of the object, it may be determined how the animation data for the object positions one or more triangles of the first polygonal mesh in the frame. A rest state of one or more triangles of a second polygonal mesh for the object may be modified based on how the animation data positions the one or more triangle of the first polygonal mesh in the frame. Position in the frame of the one or more triangles of the first polygon or one or more triangles of another polygonal mesh representing the object may be manipulated based on how the animation data positions the one or more triangles of the first polygon in the frame and how simulation data positions the one or more triangles of the second polygonal mesh in the frame. The simulation data generated in response to the modified rest state of the one or more triangles of the second polygonal mesh for the object and a simulation of the second polygonal mesh using a finite element method and a set of invertible finite elements that exist on the second mesh.

In at least one aspect, manipulating position in the frame of the one or more triangles may include includes adding at least one of skin detail, muscle detail, and fat detail determined using the finite element method. In at least one aspect, manipulating position in the frame of the one or more triangles may include includes conforming to a wrinkle map.

A further understanding of the nature of and equivalents to the subject matter of this disclosure (as well as any inherent or express advantages and improvements provided) should be realized in addition to the above section by reference to the remaining portions of this disclosure, any accompanying drawings, and the claims.

BRIEF DESCRIPTION OF THE DRAWINGS

In order to reasonably describe and illustrate those innovations, embodiments, and/or examples found within this disclosure, reference may be made to one or more accompanying drawings. The additional details or examples used to describe the one or more accompanying drawings should not be considered as limitations to the scope of any of the claimed inventions, any of the presently described embodiments and/or examples, or the presently understood best mode of any innovations presented within this disclosure.

DETAILED DESCRIPTION

This disclosure relates to computer-generated imagery (CGI) and computer-aided animation. More specifically, this disclosure relates to techniques adding dynamically generated details to animated objects for use in CGI and computer-aided animation.

Figure 1:
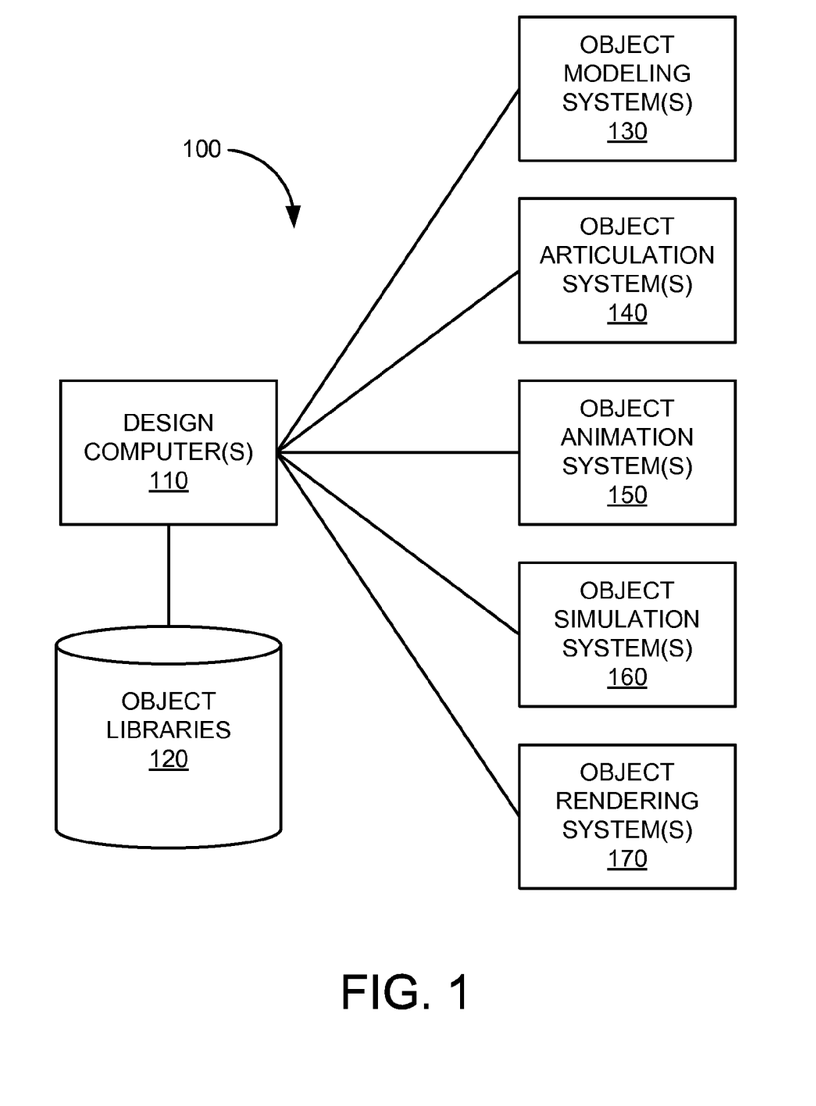
FIG. 1 is a simplified block diagram of a system for creating computer graphics imagery (CGI) and computer-aided animation that may implement or incorporate various embodiments or techniques for adding dynamically generated details to animated objects.

FIG. 1 is a simplified block diagram of system 100 for creating computer graphics imagery (CGI) and computer-aided animation that may implement or incorporate various embodiments or techniques adding dynamically generated details to animated objects. In this example, system 100 can include one or more design computers 110, object library 120, one or more object modeler systems 130, one or more object articulation systems 140, one or more object animation systems 150, one or more object simulation systems 160, and one or more object rendering systems 170.

The one or more design computers 110 can include hardware and software elements configured for designing CGI and assisting with computer-aided animation. Each of the one or more design computers 110 may be embodied as a single computing device or a set of one or more computing devices. Some examples of computing devices are PCs, laptops, workstations, mainframes, cluster computing system, grid computing systems, cloud computing systems, embedded devices, computer graphics devices, gaming devices and consoles, consumer electronic devices having programmable processors, or the like. The one or more design computers 110 may be used at various stages of a production process (e.g., pre-production, designing, creating, editing, simulating, animating, rendering, post-production, etc.) to produce images, image sequences, motion pictures, video, audio, or associated effects related to CGI and animation.

In one example, a user of the one or more design computers 110 acting as a modeler may employ one or more systems or tools to design, create, or modify objects within a computer-generated scene. The modeler may use modeling software to sculpt and refine a neutral 3D model to fit predefined aesthetic needs of one or more character designers. The modeler may design and maintain a modeling topology conducive to a storyboarded range of deformations. In another example, a user of the one or more design computers 110 acting as an articulator may employ one or more systems or tools to design, create, or modify controls or animation variables (avars) of models. In general, rigging is a process of giving an object, such as a character model, controls for movement, therein "articulating" its ranges of motion. The articulator may work closely with one or more animators in rig building to provide and refine an articulation of the full range of expressions and body movement needed to support a character's acting range in an animation. In a further example, a user of design computer 110 acting as an animator may employ one or more systems or tools to specify motion and position of one or more objects over time to produce an animation.

Object library 120 can include hardware and/or software elements configured for storing and accessing information related to objects used by the one or more design computers 110 during the various stages of a production process to produce CGI and animation. Some examples of object library 120 can include a file, a database, or other storage devices and mechanisms. Object library 120 may be locally accessible to the one or more design computers 110 or hosted by one or more external computer systems.

Some examples of information stored in object library 120 can include an object itself, metadata, object geometry, object topology, rigging, control data, animation data, animation cues, simulation data, texture data, lighting data, shader code, or the like. An object stored in object library 120 can include any entity that has an n-dimensional (e.g., 2D or 3D) surface geometry. The shape of the object can include a set of points or locations in space (e.g., object space) that make up the object's surface. Topology of an object can include the connectivity of the surface of the object (e.g., the genus or number of holes in an object) or the vertex/edge/face connectivity of an object.

The one or more object modeling systems 130 can include hardware and/or software elements configured for modeling one or more computer-generated objects. Modeling can include the creating, sculpting, and editing of an object. The one or more object modeling systems 130 may be invoked by or used directly by a user of the one or more design computers 110 and/or automatically invoked by or used by one or more processes associated with the one or more design computers 110. Some examples of software programs embodied as the one or more object modeling systems 130 can include commercially available high-end 3D computer graphics and 3D modeling software packages 3D STUDIO MAX and AUTODESK MAYA produced by Autodesk, Inc. of San Rafael, Calif.

In various embodiments, the one or more object modeling systems 130 may be configured to generated a model to include a description of the shape of an object. The one or more object modeling systems 130 can be configured to facilitate the creation and/or editing of features, such as non-uniform rational B-splines or NURBS, polygons and subdivision surfaces (or SubDivs), that may be used to describe the shape of an object. In general, polygons are a widely used model medium due to their relative stability and functionality. Polygons can also act as the bridge between NURBS and SubDivs. NURBS are used mainly for their ready-smooth appearance and generally respond well to deformations. SubDivs are a combination of both NURBS and polygons representing a smooth surface via the specification of a coarser piecewise linear polygon mesh. A single object may have several different models that describe its shape.

The one or more object modeling systems 130 may further generate model data (e.g., 2D and 3D model data) for use by other elements of system 100 or that can be stored in object library 120. The one or more object modeling systems 130 may be configured to allow a user to associate additional information, metadata, color, lighting, rigging, controls, or the like, with all or a portion of the generated model data.

The one or more object articulation systems 140 can include hardware and/or software elements configured to articulating one or more computer-generated objects. Articulation can include the building or creation of rigs, the rigging of an object, and the editing of rigging. The one or more object articulation systems 140 may be invoked by or used directly by a user of the one or more design computers 110 and/or automatically invoked by or used by one or more processes associated with the one or more design computers 110. Some examples of software programs embodied as the one or more object articulation systems 140 can include commercially available high-end 3D computer graphics and 3D modeling software packages 3D STUDIO MAX and AUTODESK MAYA produced by Autodesk, Inc. of San Rafael, Calif.

In various embodiments, the one or more articulation systems 140 be configured to enable the specification of rigging for an object, such as for internal skeletal structures or eternal features, and to define how input motion deforms the object. One technique is called "skeletal animation," in which a character can be represented in at least two parts: a surface representation used to draw the character (called the skin) and a hierarchical set of bones used for animation (called the skeleton).

The one or more object articulation systems 140 may further generate articulation data (e.g., data associated with controls or animations variables) for use by other elements of system 100 or that can be stored in object library 120. The one or more object articulation systems 140 may be configured to allow a user to associate additional information, metadata, color, lighting, rigging, controls, or the like, with all or a portion of the generated articulation data.

The one or more object animation systems 150 can include hardware and/or software elements configured for animating one or more computer-generated objects. Animation can include the specification of motion and position of an object over time. The one or more object animation systems 150 may be invoked by or used directly by a user of the one or more design computers 110 and/or automatically invoked by or used by one or more processes associated with the one or more design computers 110. Some examples of software programs embodied as the one or more object animation systems 150 can include commercially available high-end 3D computer graphics and 3D modeling software packages 3D STUDIO MAX and AUTODESK MAYA produced by Autodesk, Inc. of San Rafael, Calif.

In various embodiments, the one or more animation systems 150 may be configured to enable users to manipulate controls or animation variables or utilized character rigging to specify one or more key frames of animation sequence. The one or more animation systems 150 generate intermediary frames based on the one or more key frames. In some embodiments, the one or more animation systems 150 may be configured to enable users to specify animation cues, paths, or the like according to one or more predefined sequences. The one or more animation systems 150 generate frames of the animation based on the animation cues or paths. In further embodiments, the one or more animation systems 150 may be configured to enable users to define animations using one or more animation languages, morphs, deformations, or the like.

The one or more object animations systems 150 may further generate animation data (e.g., inputs associated with controls or animations variables) for use by other elements of system 100 or that can be stored in object library 120. The one or more object animations systems 150 may be configured to allow a user to associate additional information, metadata, color, lighting, rigging, controls, or the like, with all or a portion of the generated animation data.

The one or more object simulation systems 160 can include hardware and/or software elements configured for simulating one or more computer-generated objects. Simulation can include determining motion and position of an object over time in response to one or more simulated forces or conditions. The one or more object simulation systems 160 may be invoked by or used directly by a user of the one or more design computers 110 and/or automatically invoked by or used by one or more processes associated with the one or more design computers 110. Some examples of software programs embodied as the one or more object simulation systems 160 can include commercially available high-end 3D computer graphics and 3D modeling software packages 3D STUDIO MAX and AUTODESK MAYA produced by Autodesk, Inc. of San Rafael, Calif.

In various embodiments, the one or more object simulation systems 160 may be configured to enables users to create, define, or edit simulation engines, such as a physics engine or physics processing unit (PPU/GPGPU) using one or more physically-based numerical techniques. In general, a physics engine can include a computer program that simulates one or more physics models (e.g., a Newtonian physics model), using variables such as mass, velocity, friction, wind resistance, or the like. The physics engine may simulate and predict effects under different conditions that would approximate what happens to an object according to the physics model. The one or more object simulation systems 160 may be used to simulate the behavior of objects, such as hair, fur, and cloth, in response to a physics model and/or animation of one or more characters and objects within a computer-generated scene.

The one or more object simulation systems 160 may further generate simulation data (e.g., motion and position of an object over time) for use by other elements of system 100 or that can be stored in object library 120. The generated simulation data may be combined with or used in addition to animation data generated by the one or more object animation systems 150. The one or more object simulation systems 160 may be configured to allow a user to associate additional information, metadata, color, lighting, rigging, controls, or the like, with all or a portion of the generated simulation data.

The one or more object rendering systems 170 can include hardware and/or software element configured for "rendering" or generating one or more images of one or more computer-generated objects. "Rendering" can include generating an image from a model based on information such as geometry, viewpoint, texture, lighting, and shading information. The one or more object rendering systems 170 may be invoked by or used directly by a user of the one or more design computers 110 and/or automatically invoked by or used by one or more processes associated with the one or more design computers 110. One example of a software program embodied as the one or more object rendering systems 170 can include PhotoRealistic RenderMan, or PRMan, produced by Pixar Animations Studios of Emeryville, Calif.

In various embodiments, the one or more object rendering systems 170 can be configured to render one or more objects to produce one or more computer-generated images or a set of images over time that provide an animation. The one or more object rendering systems 170 may generate digital images or raster graphics images.

In various embodiments, a rendered image can be understood in terms of a number of visible features. Some examples of visible features that may be considered by the one or more object rendering systems 170 may include shading (e.g., techniques relating to how the color and brightness of a surface varies with lighting), texture-mapping (e.g., techniques relating to applying detail information to surfaces or objects using maps), bump-mapping (e.g., techniques relating to simulating small-scale bumpiness on surfaces), fogging/participating medium (e.g., techniques relating to how light dims when passing through non-clear atmosphere or air; shadows (e.g., techniques relating to effects of obstructing light), soft shadows (e.g., techniques relating to varying darkness caused by partially obscured light sources), reflection (e.g., techniques relating to mirror-like or highly glossy reflection), transparency or opacity (e.g., techniques relating to sharp transmissions of light through solid objects), translucency (e.g., techniques relating to highly scattered transmissions of light through solid objects), refraction (e.g., techniques relating to bending of light associated with transparency, diffraction (e.g., techniques relating to bending, spreading and interference of light passing by an object or aperture that disrupts the ray), indirect illumination (e.g., techniques relating to surfaces illuminated by light reflected off other surfaces, rather than directly from a light source, also known as global illumination), caustics (e.g., a form of indirect illumination with techniques relating to reflections of light off a shiny object, or focusing of light through a transparent object, to produce bright highlights on another object), depth of field (e.g., techniques relating to how objects appear blurry or out of focus when too far in front of or behind the object in focus), motion blur (e.g., techniques relating to how objects appear blurry due to high-speed motion, or the motion of the camera), non-photorealistic rendering (e.g., techniques relating to rendering of scenes in an artistic style, intended to look like a painting or drawing), or the like.

The one or more object rendering systems 170 may further render images (e.g., motion and position of an object over time) for use by other elements of system 100 or that can be stored in object library 120. The one or more object rendering systems 170 may be configured to allow a user to associate additional information or metadata with all or a portion of the rendered image.

Skin and Volume Sim

In various embodiments, system 100 may include one or more hardware elements and/or software elements, components, tools, or processes, embodied as the one or more design computers 110, object library 120, the one or more object modeler systems 130, the one or more object articulation systems 140, the one or more object animation systems 150, the one or more object simulation systems 160, and/or the one or more object rendering systems 170 that provide one or more tools for adding dynamically generated details to animated objects for use in CGI and computer-aided animation.

In some embodiments, system 100 enables object, such as surfaces representing flesh and skin of animated characters, to be posed based on combinations of animated details and simulation details. System 100 can utilize animation data at each frame or time step of an animation sequence for an animated object to update state information at each frame or time step of the animation sequence of corresponding simulated objects. System 100 may then incorporate simulation results using the updated state information to add details determined by one or more simulations of the simulated objects back to the animated objects.

Figure 2:
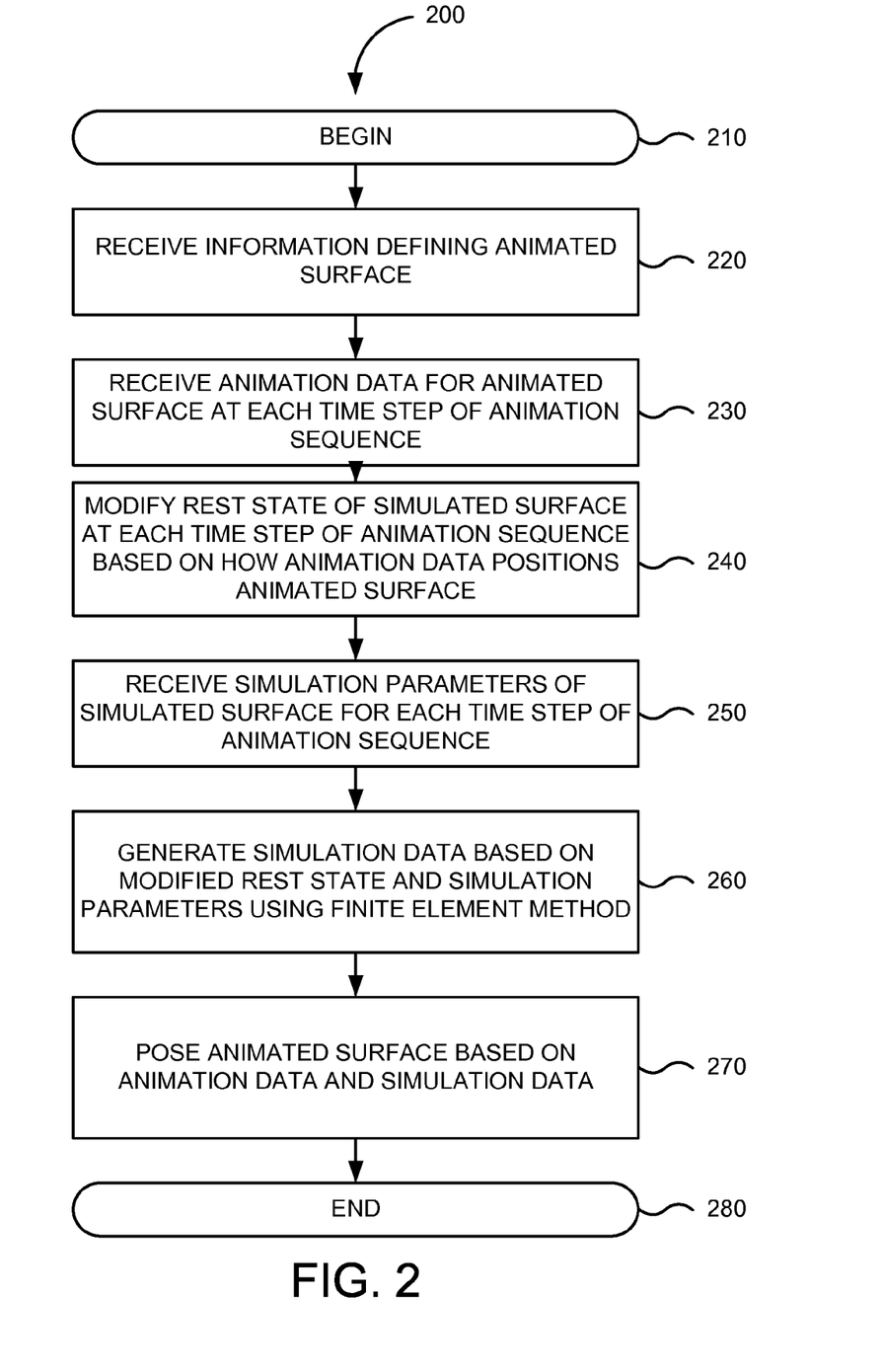
FIG. 2 is a flowchart of a method for adding dynamically generated details to animated objects for use in CGI and computer-aided animation in one embodiment.

FIG. 2 is a flowchart of method 200 for adding dynamically generated details to animated objects for use in CGI and computer-aided animation in one embodiment. Implementations of or processing in method 200 depicted in FIG. 2 may be performed by software (e.g., instructions or code modules) when executed by a central processing unit (CPU or processor) of a logic machine, such as a computer system or information processing device, by hardware components of an electronic device or application-specific integrated circuits, or by combinations of software and hardware elements. Method 200 depicted in FIG. 2 begins in step 210.

In step 220, information defining an animated surface is received. The information defining the animated surface may specify geometry and topology of a surface. The surface may be represented by one or more elements, such as triangles, rectangles, or other polygons. The surface may further be defined by one or more known techniques in the art, such as NURBS, subdivision surfaces, patches, or the like. Other information, such as material properties, lighting, shading, texturing, and displacement, and additional geometry may be associated with the surface.

Figure 3:
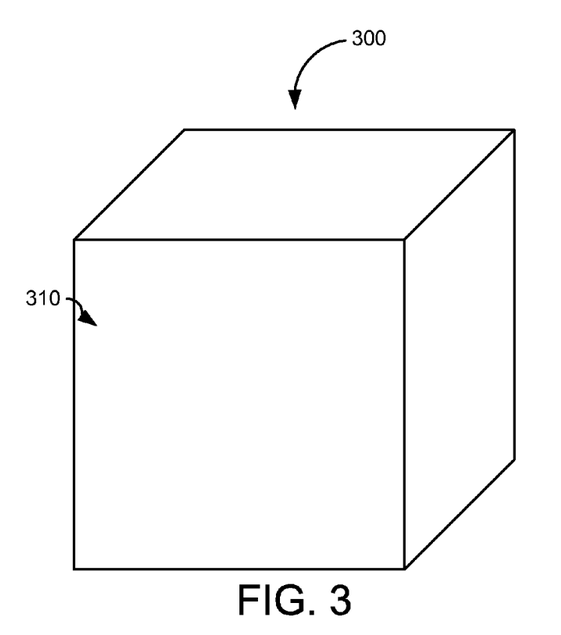
FIG. 3 is a diagram illustrating an animated object in one embodiment.

FIG. 3 is a diagram illustrating object 300 in one embodiment. In this example, object 300 is defined to represent a cube having six square faces or surfaces, one of the square faces or surfaces being surface 310.

Returning to FIG. 2, in step 230, animation data is received for the surface at each time step of an animation sequence. The animation data may directly or indirectly specify the position of all or part of the animated surface at a plurality of time steps. In one example, the animation data may be derived from one or more animation cues specifying a plurality of time steps input values for one or more defomers, controls, or animation variables that deform the geometry of all or part of the animated surface or otherwise manipulate all or part of the animated surface into resulting positions. In another embodiments, the animation data may include the position of all or part of the animated surface as defined or otherwise specified directly or indirectly by an animator, such as using forward or inverse kinematic techniques. In other embodiments, the animation data may include the position of all or part of the animated surface as defined directly or indirectly using motion capture or one or more procedural techniques.

Figure 4:
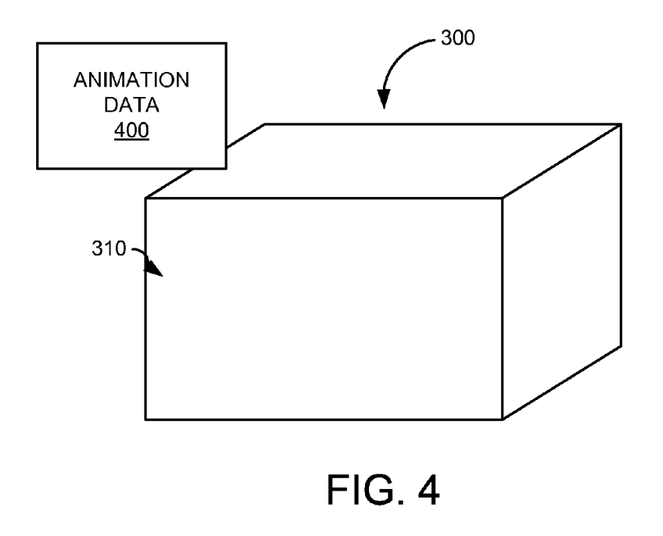
FIG. 4 is a diagram illustrating the animated object of FIG. 3 after being animated in one embodiment.

FIG. 4 is a diagram illustrating animated object 300 of FIG. 3 after being animated in one embodiment. In this example, position of all or part of animated object 300 is changed in response to animation data 500. Animation data 500 may specify how position of all or part of animated object 300 (e.g., surface 310) changes at time T+1 from time T. All or part of animated object 300 may undergo one or more operations, such as translation, rotation, or sheering. Other transformations may occur to the shape of all or part of animated object 300. Additionally, transformations of properties associated with animated object 300, such as size, shape, material effects, lighting effects, etc. may also occur. In this example, animation data 400 causes animated object 300 to be manipulated from being substantially cube-like at time T to being substantially rectangular at time T+1.

In various embodiments, aspects or details for animated object 300 that are not provided by an animator may be dynamically generated or simulated. Accordingly, the details may be represented by other simulated objects. For example, if animated object 300 represents the outer surface of a character, details typically provided by skin, muscle, and fat may be included along with how the animator poses the character. Such details may be generated using one or more additional simulated objects that have a correspondence to the animated object.

Figure 5:
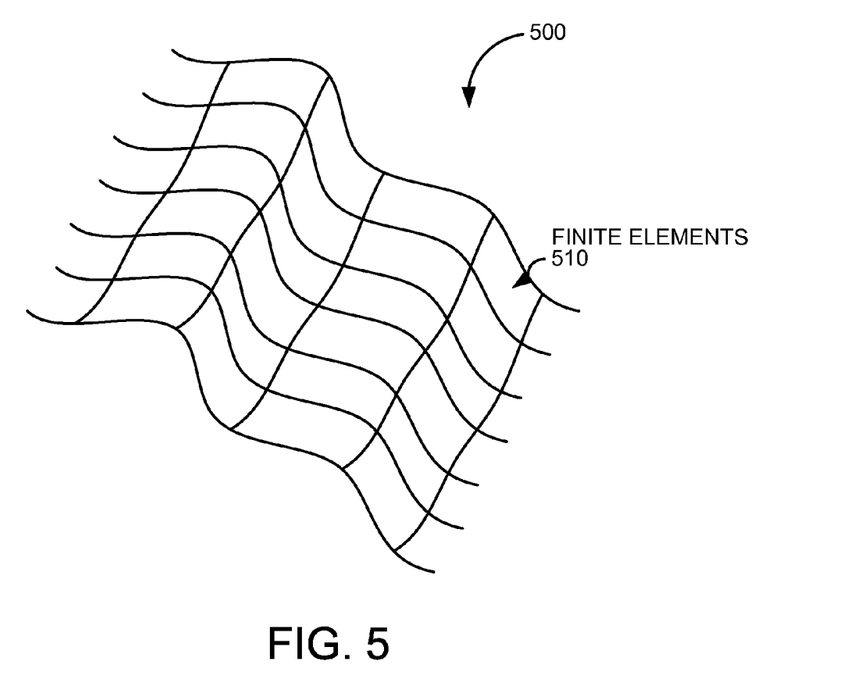
FIG. 5 is a diagram illustrating a simulated object in one embodiment.

FIG. 5 is a diagram illustrating simulated surface 500 in one embodiment. In this example, simulated surface 500 is a 2-dimensional surface. Simulated surface 500 may be defined to include finite elements 500 that may be used during a finite element analysis.

Typically, geometry, topology, and other material properties defined for any simulated object provide the shape that a designer wants the object to maintain during various simulations. This forms one part of a rest state of a simulated object. Typically, the rest shape of a simulated object remains the same throughout a simulation. However, in various embodiments, the rest state of simulated object may be retargeted to account for changes in an animated object introduced by animation data.

Figure 6A:
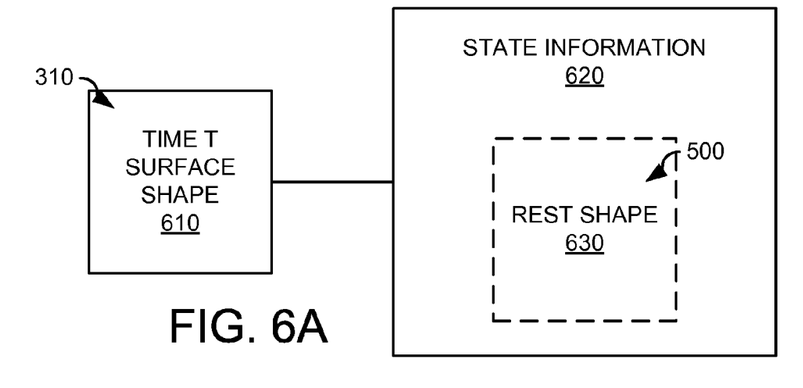
FIG. 6A is a diagram illustrating shape of an animated surface associated with the animated object of FIG. 3 and associated state information for a corresponding simulated surface in one embodiment.

FIG. 6A is a diagram illustrating shape 610 of surface 310 associated with animated object 300 of FIG. 3 and associated state information 620 for corresponding simulated surface 500 in one embodiment. In this example, shape 610 of surface 310 is substantially square. State information 620 may refer to a rest state or rest shape 630 of the simulated surface 500.

Figure 6B:
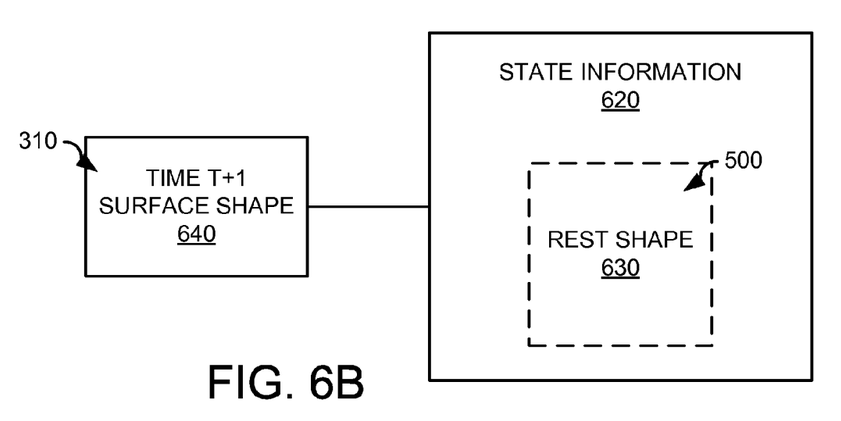
FIG. 6B is a diagram illustrating shape of the animated surface associated with the animated object of FIG. 3 after being animated and associated state information of the corresponding simulated surface in one embodiment.

FIG. 6B is a diagram illustrating shape 640 of surface 310 after being animated and associated state information 620. Animation data 400, in this example, changes surface 310 at time T from including surface shape 610 to include surface shape 640 at time T+1. Normally, transformations associated with animation data 400 are not reflected in state information 620. Typically, once the rest state of an object is establish, an animator desires the object to maintain the same rest state throughout an animation sequence such that the object responds consistently under simulation. Yet, in various embodiments, the rest state of the target surface can be retargeted or otherwise modified at each time step of an animation sequence based on how animation data positions the target surface. Accordingly, an animator may pose the target surface and have the rest state of the target surface updated such that a simulation of target surface incorporates the new rest state.

Figure 6C:
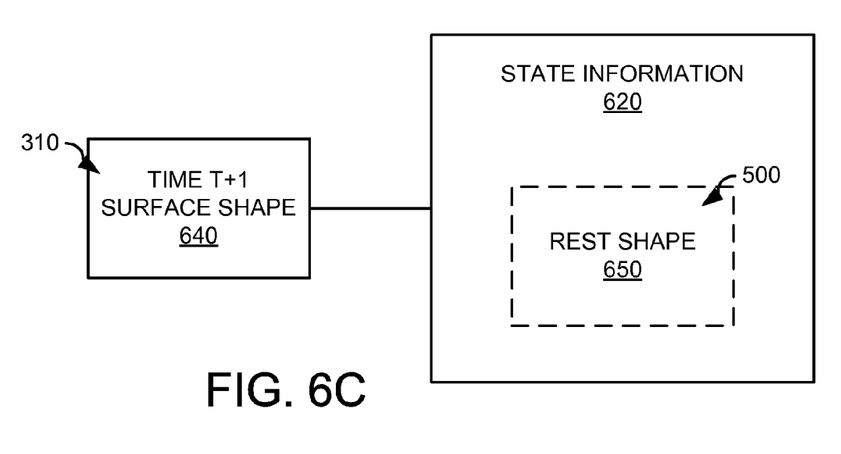
FIG. 6C is a diagram illustrating shape of the animated surface associated with the animated object of FIG. 3 after being animated and associated modified state information of the corresponding simulated surface in one embodiment.

Returning to FIG. 2, in step 240, a rest state of a simulation surface at each time step of the animation sequence is modified based on how the animation data positions the animated surface. For example, FIG. 6C is a diagram illustrating shape 640 of animated surface 310 associated with animated object 300 of FIG. 3 after being animated and associated modified state information 620 of corresponding simulated surface 500 in one embodiment. Accordingly, state information 620 may be modified such that surface 310 including surface shape 640 at time T+1 is associated with state information 620 at time T+1 that includes rest shape 650. Rest shape 650 now provides an updated reference as to the shape (or state) to which surface 310 tends to return absent or in light of other influences at time T+1.

This process can be used, for example, for animating large fleshy characters (e.g., animals) where an animator desires to pose portions of the character's skin while further allowing simulations to provide the remaining details.

Returning again to FIG. 2, in step 250, simulation parameters of the simulated surface are received for each time step. Some examples of simulation parameters can include material properties, spring parameters, damping parameters, stiffness parameters, rigidness parameters, density parameters, stretchiness parameters, incompressibility parameters, inertial compensation parameters, or the like. Other examples may include wrinkle maps or other maps defined on or at the animated or the simulated surface. In some embodiment, the simulation parameters may include information defining finite elements 500.

In step 260, simulation data is generated based the modified rest state of the simulated surface and the simulation parameters using a finite element method. In some aspects, the simulation data represents details for simulated surface 500, such as ripples, jiggles, wrinkles, textures, or the like. The simulation data may define the motion and position for simulated surface 500 that was generated using finite elements 510. In various embodiments, one or more computer simulations may be augmented with one or more physically-based number techniques, spring models, or the like.

In step 270, the animated surface is posed based on the animation data and the simulation data. In some embodiments, the same animated surface is posed based on both the animation data and the simulation data. In other embodiments, another surface (e.g., a third surface) may be generated based on the animation data and the simulation data. In further embodiments, a surface can be posed or generated based on a predetermined amount of the animation data and a predetermined amount of the simulation data. Such predetermined amounts may be manually or procedurally determined and combined using one or more blending techniques. FIG. 2 ends in step 280.

Figure 7:
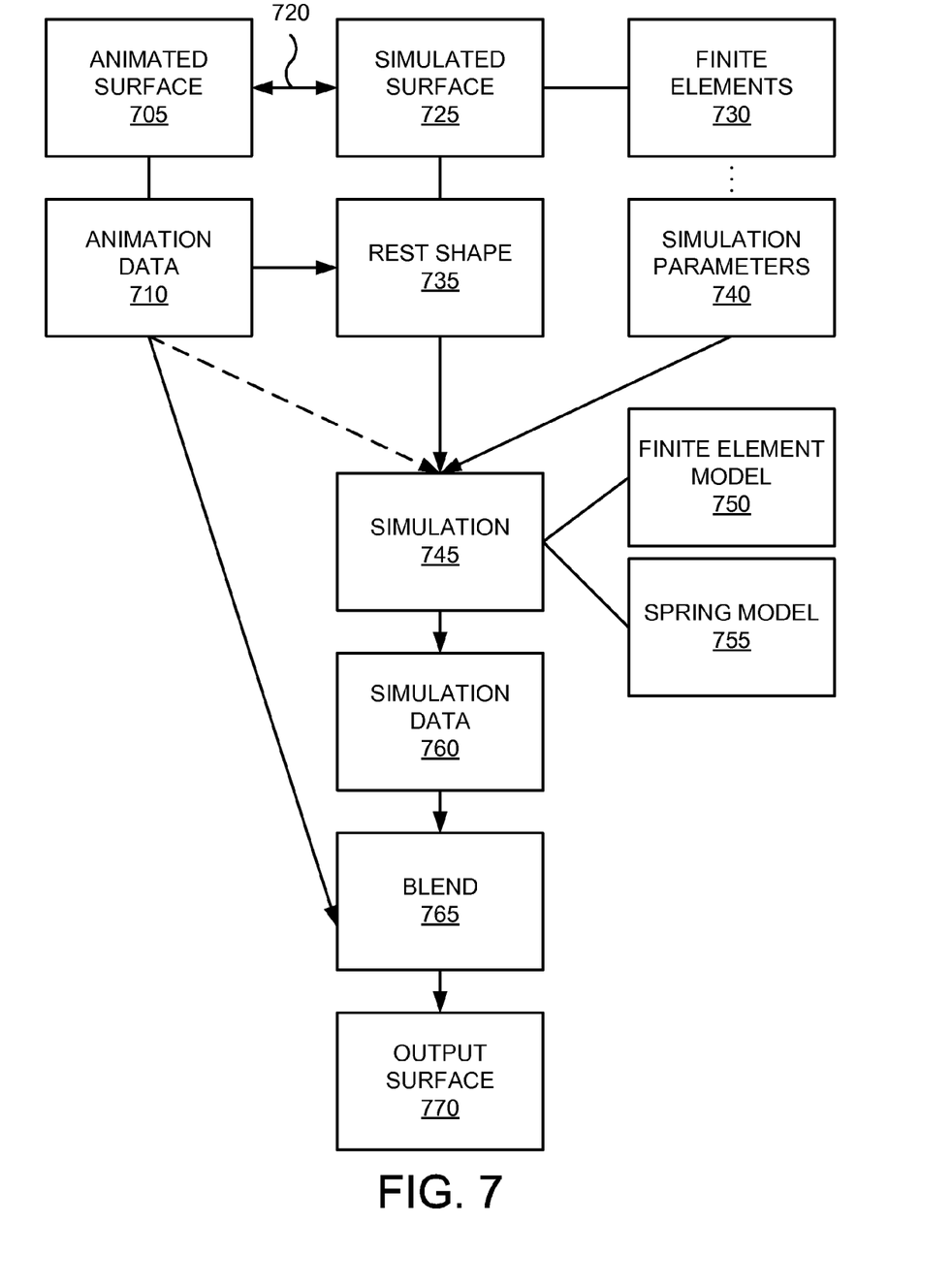
FIG. 7 is a block diagram illustrating generating of an output surface with dynamic details in one embodiment.

FIG. 7 is a block diagram block diagram illustrating generating of an output surface with dynamic details in one embodiment. In this example, information is received identifying or specifying animated surface 705 (e.g., a polygonal mesh suitable for animation tasks). Animated surface 705 can be animated using animation data 710. Animated surface 710 can be correlated using correspondence 720 with a corresponding simulated surface 725 (e.g., another polygonal mesh suitable for simulation tasks). Simulated surface 725 may have a set of finite elements 730 that exist on simulated surface 725.

In various embodiments, animation data 710 may be used to modify or retarget rest shape 735 of simulated surface 725 at various time steps in an animation sequence. Rest shape 735 and simulation parameters 740 can be used in simulation 745. Using finite element model 750, simulation 745 may incorporate finite elements 730 with one or more finite elements methods in one or more simulations of simulated surface 725.

In some embodiments, simulation 745 may be augmented with spring model 755 at each step of the animation sequence. In one aspect, spring model 755 may indicate that motion of one or more portions of simulated surface 725 may be constrained along a predetermined shape of animated surface 705 or relative to a predetermined shape of animated surface 705.

For example, simulation 745 may be augmented to allow skin of an animated character to appear to slide around on without substantially deviating from the silhouette of the animated character. In another aspect, spring model 755 may indicate that one or more portions of simulated surface 725 may be constraint to seek to return to a corresponding location on animated character 705. For example, even though the skin on the animated character may slide around, the skin may attempt to return to its original location.

Simulation 745 generates simulation data 760. Some examples of simulation data 760 that may be determined by simulation 745 can include surface appearance, surface shape, surface texture, wrinkles, bulges, or the like. Simulation 745 may further have the effect of volume preservation in generating simulation data 760.

In a still further aspect, information may be received indicative of blend 765. A user may specify an amount for animation data 710 and simulation data 760 that will be used to generate or otherwise pose output surface 770.

Figure 8:
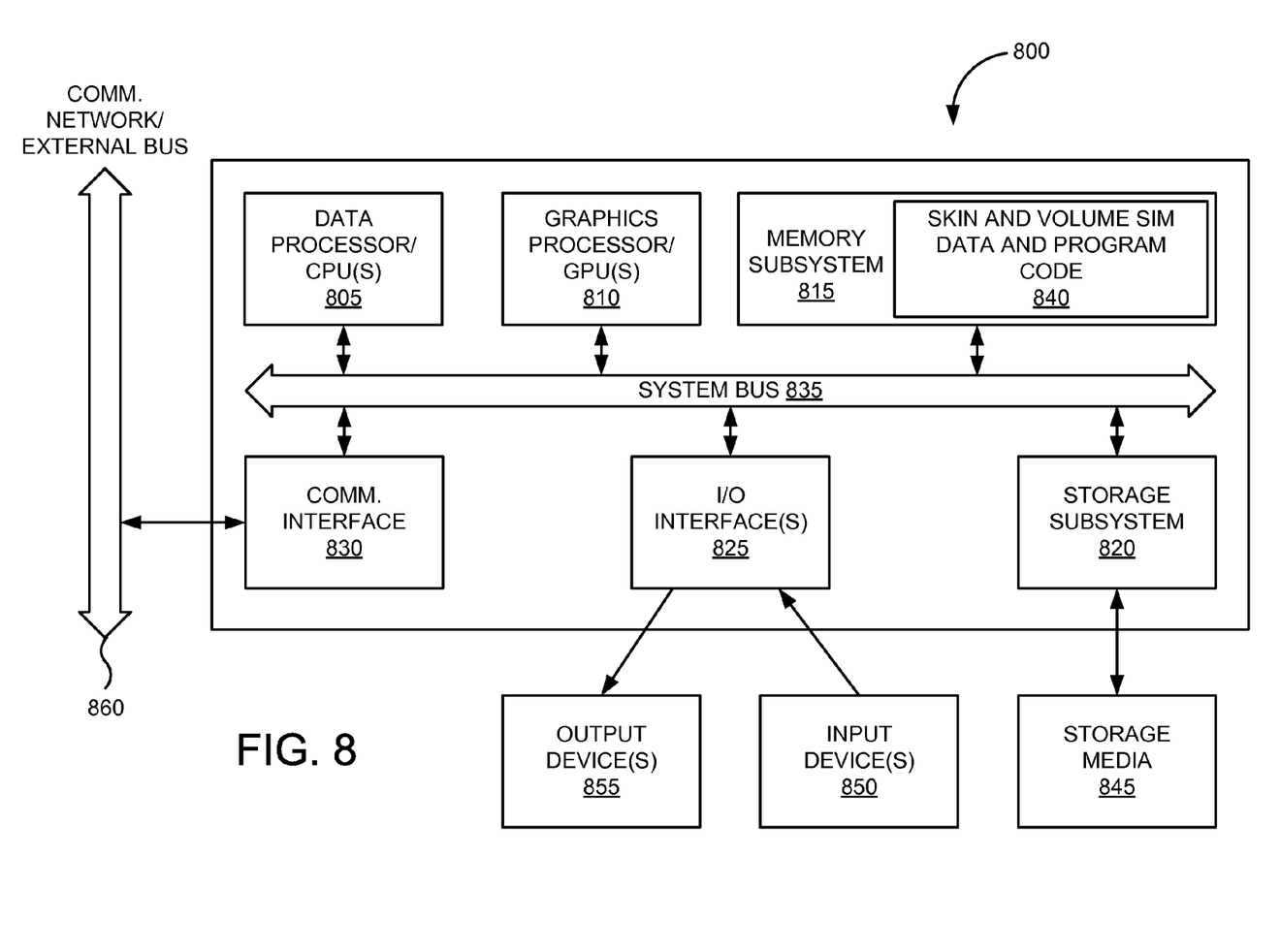
FIG. 8 is a block diagram of a computer system or information processing device that may incorporate an embodiment, be incorporated into an embodiment, or be used to practice any of the innovations, embodiments, and/or examples found within this disclosure.

FIG. 8 is a block diagram of computer system 800 that may incorporate an embodiment, be incorporated into an embodiment, or be used to practice any of the innovations, embodiments, and/or examples found within this disclosure. FIG. 8 is merely illustrative of a computing device, general-purpose computer system programmed according to one or more disclosed techniques, or specific information processing device for an embodiment incorporating an invention whose teachings may be presented herein and does not limit the scope of the invention as recited in the claims. One of ordinary skill in the art would recognize other variations, modifications, and alternatives.

Computer system 800 can include hardware and/or software elements configured for performing logic operations and calculations, input/output operations, machine communications, or the like. Computer system 800 may include familiar computer components, such as one or more one or more data processors or central processing units (CPUs) 805, one or more graphics processors or graphical processing units (GPUs) 810, memory subsystem 815, storage subsystem 820, one or more input/output (I/O) interfaces 825, communications interface 830, or the like. Computer system 800 can include system bus 835 interconnecting the above components and providing functionality, such connectivity and inter-device communication. Computer system 800 may be embodied as a computing device, such as a personal computer (PC), a workstation, a mini-computer, a mainframe, a cluster or farm of computing devices, a laptop, a notebook, a netbook, a PDA, a smartphone, a consumer electronic device, a gaming console, or the like.

The one or more data processors or central processing units (CPUs) 805 can include hardware and/or software elements configured for executing logic or program code or for providing application-specific functionality. Some examples of CPU(s) 805 can include one or more microprocessors (e.g., single core and multi-core) or micro-controllers. CPUs 805 may include 4-bit, 8-bit, 12-bit, 16-bit, 32-bit, 64-bit, or the like architectures with similar or divergent internal and external instruction and data designs. CPUs 805 may further include a single core or multiple cores. Commercially available processors may include those provided by Intel of Santa Clara, Calif. (e.g., x86, x86_64, PENTIUM, CELERON, CORE, CORE 2, CORE ix, ITANIUM, XEON, etc.), by Advanced Micro Devices of Sunnyvale, Calif. (e.g., x86, AMD_64, ATHLON, DURON, TURION, ATHLON XP/64, OPTERON, PHENOM, etc). Commercially available processors may further include those conforming to the Advanced RISC Machine (ARM) architecture (e.g., ARMv7-

9), POWER and POWERPC architecture, CELL architecture, and or the like. CPU(s) 805 may also include one or more field-gate programmable arrays (FPGAs), application-specific integrated circuits (ASICs), or other microcontrollers. The one or more data processors or central processing units (CPUs) 805 may include any number of registers, logic units, arithmetic units, caches, memory interfaces, or the like. The one or more data processors or central processing units (CPUs) 805 may further be integrated, irremovably or moveably, into one or more motherboards or daughter boards.

The one or more graphics processor or graphical processing units (GPUs) 810 can include hardware and/or software elements configured for executing logic or program code associated with graphics or for providing graphics-specific functionality. GPUs 810 may include any conventional graphics processing unit, such as those provided by conventional video cards. Some examples of GPUs are commercially available from NVIDIA, ATI, and other vendors. In various embodiments, GPUs 810 may include one or more vector or parallel processing units. These GPUs may be user programmable, and include hardware elements for encoding/decoding specific types of data (e.g., video data) or for accelerating 2D or 3D drawing operations, texturing operations, shading operations, or the like. The one or more graphics processors or graphical processing units (GPUs) 810 may include any number of registers, logic units, arithmetic units, caches, memory interfaces, or the like. The one or more data processors or central processing units (CPUs) 805 may further be integrated, irremovably or moveably, into one or more motherboards or daughter boards that include dedicated video memories, frame buffers, or the like.

Memory subsystem 815 can include hardware and/or software elements configured for storing information. Memory subsystem 815 may store information using machine-readable articles, information storage devices, or computer-readable storage media. Some examples of these articles used by memory subsystem 870 can include random access memories (RAM), read-only-memories (ROMS), volatile memories, non-volatile memories, and other semiconductor memories. In various embodiments, memory subsystem 815 can include skin and volume sim data and program code 840.

Storage subsystem 820 can include hardware and/or software elements configured for storing information. Storage subsystem 820 may store information using machine-readable articles, information storage devices, or computer-readable storage media. Storage subsystem 820 may store information using storage media 845. Some examples of storage media 845 used by storage subsystem 820 can include floppy disks, hard disks, optical storage media such as CD-ROMS, DVDs and bar codes, removable storage devices, networked storage devices, or the like. In some embodiments, all or part of skin and volume sim data and program code 840 may be stored using storage subsystem 820.

In various embodiments, computer system 800 may include one or more hypervisors or operating systems, such as WINDOWS, WINDOWS NT, WINDOWS XP, VISTA, WINDOWS 7 or the like from Microsoft of Redmond, Wash., Mac OS or Mac OS X from Apple Inc. of Cupertino, Calif., SOLARIS from Sun Microsystems, LINUX, UNIX, and other UNIX-based or UNIX-like operating systems. Computer system 800 may also include one or more applications configured to execute, perform, or otherwise implement techniques disclosed herein. These applications may be embodied as skin and volume sim data and program code 840. Additionally, computer programs, executable computer code, human-readable source code, shader code, rendering engines, or the like, and data, such as image files, models including geometrical descriptions of objects, ordered geometric descriptions of objects, procedural descriptions of models, scene descriptor files, or the like, may be stored in memory subsystem 815 and/or storage subsystem 820.

The one or more input/output (I/O) interfaces 825 can include hardware and/or software elements configured for performing I/O operations. One or more input devices 850 and/or one or more output devices 855 may be communicatively coupled to the one or more I/O interfaces 825.

The one or more input devices 850 can include hardware and/or software elements configured for receiving information from one or more sources for computer system 800. Some examples of the one or more input devices 850 may include a computer mouse, a trackball, a track pad, a joystick, a wireless remote, a drawing tablet, a voice command system, an eye tracking system, external storage systems, a monitor appropriately configured as a touch screen, a communications interface appropriately configured as a transceiver, or the like. In various embodiments, the one or more input devices 850 may allow a user of computer system 800 to interact with one or more non-graphical or graphical user interfaces to enter a comment, select objects, icons, text, user interface widgets, or other user interface elements that appear on a monitor/display device via a command, a click of a button, or the like.

The one or more output devices 855 can include hardware and/or software elements configured for outputting information to one or more destinations for computer system 800. Some examples of the one or more output devices 855 can include a printer, a fax, a feedback device for a mouse or joystick, external storage systems, a monitor or other display device, a communications interface appropriately configured as a transceiver, or the like. The one or more output devices 855 may allow a user of computer system 800 to view objects, icons, text, user interface widgets, or other user interface elements.

A display device or monitor may be used with computer system 800 and can include hardware and/or software elements configured for displaying information. Some examples include familiar display devices, such as a television monitor, a cathode ray tube (CRT), a liquid crystal display (LCD), or the like.

Communications interface 830 can include hardware and/or software elements configured for performing communications operations, including sending and receiving data. Some examples of communications interface 830 may include a network communications interface, an external bus interface, an Ethernet card, a modem (telephone, satellite, cable, ISDN), (asynchronous) digital subscriber line (DSL) unit, FireWire interface, USB interface, or the like. For example, communications interface 830 may be coupled to communications network/external bus 880, such as a computer network, to a FireWire bus, a USB hub, or the like. In other embodiments, communications interface 830 may be physically integrated as hardware on a motherboard or daughter board of computer system 800, may be implemented as a software program, or the like, or may be implemented as a combination thereof.

In various embodiments, computer system 800 may include software that enables communications over a network, such as a local area network or the Internet, using one or more communications protocols, such as the HTTP, TCP/IP, RTP/RTSP protocols, or the like. In some embodiments, other communications software and/or transfer protocols may also be used, for example IPX, UDP or the like, for communicating with hosts over the network or with a device directly connected to computer system 800.

As suggested, FIG. 8 is merely representative of a general-purpose computer system appropriately configured or specific data processing device capable of implementing or incorporating various embodiments of an invention presented within this disclosure. Many other hardware and/or software configurations may be apparent to the skilled artisan which are suitable for use in implementing an invention presented within this disclosure or with various embodiments of an invention presented within this disclosure. For example, a computer system or data processing device may include desktop, portable, rack-mounted, or tablet configurations. Additionally, a computer system or information processing device may include a series of networked computers or clusters/grids of parallel processing devices. In still other embodiments, a computer system or information processing device may perform techniques described above as implemented upon a chip or an auxiliary processing board.

Various embodiments of any of one or more inventions whose teachings may be presented within this disclosure can be implemented in the form of logic in software, firmware, hardware, or a combination thereof. The logic may be stored in or on a machine-accessible memory, a machine-readable article, a tangible computer-readable medium, a computer-readable storage medium, or other computer/machine-readable media as a set of instructions adapted to direct a central processing unit (CPU or processor) of a logic machine to perform a set of steps that may be disclosed in various embodiments of an invention presented within this disclosure. The logic may form part of a software program or computer program product as code modules become operational with a processor of a computer system or an information-processing device when executed to perform a method or process in various embodiments of an invention presented within this disclosure. Based on this disclosure and the teachings provided herein, a person of ordinary skill in the art will appreciate other ways, variations, modifications, alternatives, and/or methods for implementing in software, firmware, hardware, or combinations thereof any of the disclosed operations or functionalities of various embodiments of one or more of the presented inventions.

The disclosed examples, implementations, and various embodiments of any one of those inventions whose teachings may be presented within this disclosure are merely illustrative to convey with reasonable clarity to those skilled in the art the teachings of this disclosure. As these implementations and embodiments may be described with reference to exemplary illustrations or specific figures, various modifications or adaptations of the methods and/or specific structures described can become apparent to those skilled in the art. All such modifications, adaptations, or variations that rely upon this disclosure and these teachings found herein, and through which the teachings have advanced the art, are to be considered within the scope of the one or more inventions whose teachings may be presented within this disclosure. Hence, the present descriptions and drawings should not be considered in a limiting sense, as it is understood that an invention presented within a disclosure is in no way limited to those embodiments specifically illustrated.

Accordingly, the above description and any accompanying drawings, illustrations, and figures are intended to be illustrative but not restrictive. The scope of any invention presented within this disclosure should, therefore, be determined not with simple reference to the above description and those embodiments shown in the figures, but instead should be determined with reference to the pending claims along with their full scope or equivalents.

What is claimed is:

1. A method for facilitating computer-generated animation, the method comprising:
receiving, at the one or more computer systems, animation data associated with a first object for an animation sequence, the animation data specifying how one or more vertices associated with a first mesh representing the first object are positioned to form a pose for the first object at each of a plurality of time steps of the animation sequence; and
at each of the plurality of time steps of the animation sequence:
generating, with one or more processors associated with the one or more computer systems, simulation data for a second object specifying how one or more vertices associated with a second mesh representing the second object are positioned to form a pose for the second object at the time step of the animation sequence in response to a simulation of the second object at the time step of the animation sequence using a finite element method and simulation properties associated with the second mesh that define a set of finite elements in the interior of the second mesh and how the second mesh physically behaves during simulations, wherein one or more inputs to the simulation of the second object at the time step of the animation sequence are retargeted based on the animation data at the time step of the animation sequence such that a rest state of the second mesh that provides a shape that the second mesh seeks to maintain during the simulation at the time step of the animation sequence is modified responsive to the animation data at the time step of the animation sequence;
generating, with the one or more processors associated with the one or more computer systems, a third mesh representing a combination of the first object and the second object at the time step of the animation sequence based on blending the first mesh at the time step of the animation sequence, the animation data at the time step of the animation sequence, the second mesh at the time step of the animation sequence, and the simulation data at the time step of the animation sequence, the third surface at the time step of the animation sequence having a set of vertices positioned according to the one or more vertices positioning the first mesh at the time step of the animation sequence and the one or more vertices positioning the second mesh at the time step of the animation sequence; and
storing information associated with the third mesh at the time step of the animation sequence in a storage device associated with the one or more computer systems.

2. The method of claim 1 wherein generating, with the one or more processors associated with the one or more computer systems, the third mesh representing a combination of the first object and the second object at the time step of the animation sequence comprises generating the third mesh with a surface provided in part by the animation data at the time step of the animation sequence and surface details provided in part by the simulation data at the time step of the animation sequence.

3. The method of claim 1 wherein generating, with the one or more processors associated with the one or more computer systems, the third mesh representing a combination of the first object and the second object at the time step of the animation sequence comprises blending between a predetermined amount of a surface provided in part by the animation data at the time step of the animation sequence and a predetermined amount of surface details provided in part by the simulation data at the time step of the animation sequence.

4. The method of claim 1 wherein generating, with the one or more processors associated with the one or more computer systems, the third mesh representing a combination of the first object and the second object at the time step of the animation sequence comprises preserving the silhouette of the first object at the time step of the animation sequence.

5. The method of claim 1 further comprising:
generating, with the one or more processors associated with the one or more computer systems, the simulation data at the time step of the animation sequence in response to a spring model that constrains motion of the second mesh at the time step of the animation sequence relative to a predetermined shape of the first object at the time step of the animation sequence.

6. The method of claim 1 further comprising:
generating, with the one or more processors associated with the one or more computer systems, the simulation data at the time step of the animation sequence in response to a spring model that influences how a location associated with the second object at the time step of the animation sequence seeks to return toward a location associated with the first object at the time step of the animation sequence.

7. The method of claim 1 further comprising receiving, at the one or more computer systems, information defining the first mesh or the second mesh as a polygonal mesh having a plurality of triangles.

8. The method of claim 1 wherein the simulation properties comprise a damping parameter, a rigidness parameter, a stretchiness parameter, a stiffness parameter, an incompressibility parameter, an inertial compensation parameter, or a map.

9. A non-transitory computer-readable medium storing computer-executable code that when executed by a processor of a computer system configures the processor for facilitating computer-generated animation, the non-transitory computer-readable medium comprising:
code for receiving animation data associated with a first object for an animation sequence, the animation data specifying how one or more vertices associated with a first mesh representing the first object are positioned to form a pose for the first object at each of a plurality of time steps of the animation sequence;
code for generating simulation data for each of the plurality of time steps of the animation sequence for a second object specifying how one or more vertices associated with a second mesh representing the second object are positioned to form a pose for the second object at each time step of the animation sequence in response to a simulation of the second object at each time step of the animation sequence using a finite element method and simulation properties associated with the second mesh that define a set of finite elements in the interior of the second mesh and how the second mesh physically behaves during simulations, wherein one or more inputs to the simulation each time step of the animation sequence are retargeted based on the animation data at the time step such that a rest state of the second mesh that provides a shape that the second mesh seeks to maintain during the simulation at the time step of the animation sequence is modified responsive to the animation data at the time step of the animation sequence; and
code for generating a third mesh representing a combination of the first object and the second object at every time step of the animation sequence based on blending the first mesh at the time step of the animation sequence, the animation data at the time step of the animation sequence, the second surface at the time step of the animation, and the simulation data at the time step of the animation, the third surface at the time step of the animation having a set of vertices positioned according to the one or more vertices positioning the first mesh at the time step of the animation sequence and the one or more vertices positioning the second mesh at the time step of the animation sequence.

10. The computer-readable medium of claim 9 wherein the code for generating the third mesh representing a combination of the first object and the second object at each time step of the animation sequence comprises code for generating the third surface with a surface provided in part by the animation data at the time step of the animation sequence and surface details provided in part by the simulation data at the time step of the animation sequence.

11. The computer-readable medium of claim 9 wherein the code for generating the third mesh representing a combination of the first object and the second object at each time step of the animation sequence comprises code for blending between a predetermined amount of a surface provided in part by the animation data at the time step of the animation sequence and a predetermined amount of surface details provided in part by the simulation data at the time step of the animation sequence.

12. The computer-readable medium of claim 9 wherein the code for generating the third mesh representing a combination of the first object and the second object at each time step of the animation sequence comprises code for preserving the silhouette of the first object at each time step of the animation sequence.

13. The computer-readable medium of claim 9 further comprising:
code for generating the simulation data at each time step of the animation sequence in response to a spring model that constrains motion of the second mesh at each time step of the animation sequence relative to a predetermined shape of the first object at each time step of the animation sequence.

14. The computer-readable medium of claim 9 further comprising:
code for generating the simulation data at each time step of the animation sequence in response to a spring model that influences how a location associated with the second object at each time step of the animation sequence seeks to return toward a location associated with the first object at the time step of the animation sequence.

15. The computer-readable medium of claim 9 further comprising code for receiving information defining the first mesh or the second mesh as a polygonal mesh having a plurality of triangles.

16. The computer-readable medium of claim 9 wherein the simulation properties comprise a damping parameter, a rigidness parameter, a stretchiness parameter, a stiffness parameter, an incompressibility parameter, an inertial compensation parameter, or a map.

17. A method comprising:
receiving, at one or more computer systems, a first polygonal mesh representing a first object, the first polygonal mesh having a plurality of triangles;
receiving, at the one or more computer systems, animation data for the first object defining position of one or more vertices of one or more triangles of the first polygonal mesh in one or more frames of an animation;
for each of the one or more frames of the animation,
determining, with one or more processors associated with the one or more computer systems, how the animation data for the first object positions the one or more vertices of the one or more triangles of the first polygonal mesh in the frame of the animation;

generating, with one or more processors associated with the one or more computer systems, simulation data for a second object defining position of one or more vertices of one or more triangles of a second polygonal mesh representing the second object in the frame of the animation in response to a simulation of the second object using a finite element method and a set of invertible finite elements associated with the second polygonal mesh, wherein one or more inputs to the simulation of the second object are retargeted based on a determination of how the animation data for the first object positions vertices of triangles of the first polygonal mesh in the frame such that a rest state of the one or more triangles of the second polygonal mesh that provides a shape that the one or more triangles of the second polygonal mesh seek to maintain in the frame of the animation is modified responsive to the animation data for the first object; and manipulating, with the one or more processors associated with the one or more computer systems, position of one or more vertices of one or more triangles of a third polygonal mesh representing a combination of the first object and the second object in the frame of the animation based on blending the animation data that positions the one or more triangles of the first polygonal mesh in the frame of the animation and the simulation data that positions the one or more triangles of the second polygonal mesh in the frame of the animation.

18. The method of claim 17 wherein manipulating, with the one or more processors associated with the one or more computer systems, position of the one or more vertices of the one or more triangles of the third polygonal mesh includes adding skin detail, muscle detail, or fat details represented in a pose of the second polygonal mesh determined using the finite element method to a pose of the first polygonal mesh determined using the animation data.

19. The method of claim 17 wherein manipulating, with the one or more processors associated with the one or more computer systems, position of the one or more vertices of the one or more triangles of the third polygonal mesh further includes conforming to a wrinkle map.

20. The method of claim 17 wherein manipulating, with the one or more processors associated with the one or more computer systems, position of the one or more vertices of the one or more triangles of the third polygonal mesh includes blending predetermined amounts of how the animation data positions the one or more triangles of the first polygonal mesh in the frame of the animation and how the simulation data positions the one or more triangles of the second polygonal mesh in the frame of the animation.

* * * * *